United States Patent
Hood et al.

(10) Patent No.: US 7,856,279 B2
(45) Date of Patent: Dec. 21, 2010

(54) MODULE STRUCTURE AND USE FOR INDUSTRIAL CONTROL SYSTEMS

(75) Inventors: Gavan W. Hood, Upper Lockyer (AU); Kenwood H. Hall, Hudson, OH (US); Sujeet Chand, Brookfield, WI (US); Paul R. D'Mura, Glendale, AZ (US); Michael D. Kalan, Highland Heights, OH (US); Kenneth S. Plache, Scottsdale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 528 days.

(21) Appl. No.: 11/536,715

(22) Filed: Sep. 29, 2006

(65) Prior Publication Data
US 2008/0188956 A1 Aug. 7, 2008

(51) Int. Cl.
*G05B 11/01* (2006.01)
(52) U.S. Cl. ........................................................ 700/19
(58) Field of Classification Search .................. 700/11, 700/17, 18, 19, 32, 83, 86; 717/100–109; 719/315
See application file for complete search history.

(56) References Cited

U.S. PATENT DOCUMENTS

| | | | |
|---|---|---|---|
| 5,485,620 A | 1/1996 | Sadre et al. | |
| 5,522,066 A | 5/1996 | Lu | |
| 5,530,861 A | 6/1996 | Diamant et al. | |
| 5,812,394 A | 9/1998 | Lewis et al. | |
| 5,946,681 A | 8/1999 | Shorter | |
| 6,067,299 A | 5/2000 | DuRee | |
| 6,085,222 A | 7/2000 | Fujino et al. | |
| 6,104,962 A | 8/2000 | Sastry | |
| 6,269,254 B1 | 7/2001 | Mathis | |
| 6,539,271 B2 | 3/2003 | Lech et al. | |
| 6,868,538 B1 * | 3/2005 | Nixon et al. | 717/100 |
| 7,016,759 B2 | 3/2006 | Kaever et al. | |
| 7,043,311 B2 | 5/2006 | Nixon et al. | |
| 7,080,066 B1 | 7/2006 | Scheurich et al. | |
| 7,089,530 B1 | 8/2006 | Dardinski et al. | |
| 7,096,465 B1 | 8/2006 | Dardinski et al. | |
| 7,194,446 B1 | 3/2007 | Bromley et al. | |

(Continued)

FOREIGN PATENT DOCUMENTS

DE    101 29 564 A1    9/2002

(Continued)

OTHER PUBLICATIONS

"Datastream 7i for SQL Server"; Jun. 13, 2006; Infor; pp. 1-2.*

(Continued)

*Primary Examiner*—Albert DeCady
*Assistant Examiner*—Chad Rapp
(74) *Attorney, Agent, or Firm*—Turocy & Watson LLP; William R. Walbrun; John M. Miller (57) ABSTRACT

A logical module for an industrial automation system is provided. This includes one or more resources to perform an action and a logic component to control a state of the resources. A module employs the resources and the logic component to expose functionality of the module while providing generic interfaces to external components of the module.

20 Claims, 11 Drawing Sheets

U.S. PATENT DOCUMENTS

| | | | |
|---|---|---|---|
| 7,225,037 | B2 | 5/2007 | Shani |
| 7,395,122 | B2 | 7/2008 | Kreidler et al. |
| 7,418,305 | B2 | 8/2008 | Buesgen et al. |
| 7,505,817 | B2 | 3/2009 | McDaniel et al. |
| 7,509,249 | B2 | 3/2009 | Britt et al. |
| 2002/0059272 | A1 | 5/2002 | Porter |
| 2002/0156548 | A1 | 10/2002 | Arackaparambil et al. |
| 2003/0150927 | A1 | 8/2003 | Rosen |
| 2003/0163656 | A1 | 8/2003 | Ganton |
| 2004/0230328 | A1 | 11/2004 | Armstrong et al. |
| 2005/0125735 | A1 | 6/2005 | Cohen et al. |
| 2005/0256735 | A1* | 11/2005 | Bayne ............... 705/1 |
| 2006/0179032 | A1 | 8/2006 | Gottsman et al. |
| 2006/0206448 | A1 | 9/2006 | Hyder et al. |
| 2006/0212146 | A1 | 9/2006 | Johnson et al. |
| 2007/0089063 | A1 | 4/2007 | Breyer |
| 2007/0142941 | A1 | 6/2007 | McGreevy et al. |
| 2007/0256051 | A1* | 11/2007 | Rojer ............... 717/104 |
| 2008/0040477 | A1 | 2/2008 | Johnson et al. |
| 2008/0140230 | A1 | 6/2008 | Bromley |
| 2008/0201297 | A1 | 8/2008 | Choi et al. |

FOREIGN PATENT DOCUMENTS

| | | | |
|---|---|---|---|
| EP | 1 772 785 | A | 4/2007 |
| WO | 0195041 | A1 | 12/2001 |
| WO | 02/31607 | A | 4/2002 |
| WO | 2004086160 | A1 | 10/2004 |

OTHER PUBLICATIONS

European Search Report for European Patent Application No. EP07117140, dated May 7, 2008, 8 pages.

Sweet, et al. Managing Technology Change in Industrial Automation. An ABB Overview of Research Priorities. 1994, IEEE, pp. 3-6.

Maaref, et al. Communication System for Industrial Automation, 1997, Laboratoire Logiciels System Reseaux-Image, IEEE, pp. 1286-1291.

OA Dated Oct. 29, 2008 for U.S. Appl. No. 11/536,746, 24 pages.

OA Dated Oct. 29, 2008 for U.S. Appl. No. 11/536,791, 43 pages.

OA Dated Oct. 7, 2008 for U.S. Appl. No. 11/536,760, 23 pages.

OA Dated Jan. 9, 2009 for U.S. Appl. No. 11/536,827, 18 pages.

OA dated Apr. 13, 2009 for U.S. Appl. No. 11/536,746, 23 pages.

European Search report dated Nov. 20, 2009 for European Application No. EP 07 11 7192, 9 pages.

"SIMATIC, Working with STEP V5.1, Edition Aug. 2000, A5E00069681-03". Aug. 2000, Siemens, D-90327, Nurnberg, DE, XP002554626, 24 pages.

Fayad, et al. "HMI as a Maintenance Tool." Advances in Instrumentation and Control, Instrument Society of America, Research Triangle Park, US, vol. 2, part 1, Jan. 1, 1998, pp. 119-134, XP000875207, ISSN: 1054-0032, p. 124, last paragraph—p. 133, last paragraph, 16 pages.

OA dated Aug. 24, 2009 for U.S. Appl. No. 11/536,746, 18 pages.

OA dated Aug. 21, 2009 for U.S. Appl. No. 11/536,760, 17 pages.

OA dated Aug. 6, 2009 for U.S. Appl. No. 11/536,791, 38 pages.

OA dated Jun. 23, 2009 for U.S. Appl. No. 11/536,827, 22 pages.

OA dated Jan. 26, 2010 for U.S. Appl. No. 11/536,791, 39 pages.

OA dated Mar. 8, 2010 for U.S. Appl. No. 11/536,760, 19 pages.

OA dated Mar. 8, 2010 for U.S. Appl. No. 11/536,746, 21 pages.

OA dated Sep. 17, 2010 for U.S. Appl. No. 12/241,319, 32 pages.

* cited by examiner

MODULE STRUCTURE AND USE FOR INDUSTRIAL CONTROL SYSTEMS

TECHNICAL FIELD

The subject invention relates generally to industrial control systems and more particularly to a module structure that exposes functionality of a component between elements of an organization yet provides an abstraction from details for communicating and interacting with such elements.

BACKGROUND

Industrial controllers historically have operated in factory networks where a plurality of controllers and associated I/O modules communicate. These lower level control elements are often in communication with higher level computing systems or servers that aggregate data from the controllers and help to manage day-to-day activities of an enterprise. As systems have become more complex however, communications and functional cooperation between components has become a challenge. For instance, when users purchase multiple products from one or more vendors there is often limited interoperability and consistency between such products. Software and control engineers must then learn their unique product and how the components interact with each other. Limited product and component consistency suggest that techniques engineers learn in one product do not necessarily carry over to other implementations. In general, control and application systems use different interfaces that make mapping difficult; meanwhile qualified personnel that understand both hardware and software environments are in short supply and command high salaries.

Often times, integration of products (production and automation systems in particular) is too complex and difficult to manage. Process and control engineers cannot code and configure their respective components of a solution without concern for other system components. In addition, system startup metrics are generally not sufficient to supply clear and measurable information for the user/integrator. In one example, a user specifies a line production system with both control and software system components. The development (customization) and integration cost is significant allowing for long ramp-up and integration due to the complexity of connecting systems and uncertainty of how the system will perform. This has a significant impact beyond the cost of the control system as line commissioning and ramp-up are delayed during control system integration. A more predictable process and less complex system integration capability will reduce these costs.

Another problem with current control solutions is that users currently focus on implementation and glue logic rather than the production solution at hand. The underlying technical details have become a primary worry where engineers from multiple environments do not focus on process information (application level concerns) and values exchanged, rather they more often focus on the "how" not the "what." For instance, a user may decide to automate a manual section of their plant. The design may start at a high level but soon becomes a series of discussions regarding nonfunctional requirements e.g., DCOM, TCP, transaction rates, and the like. While these nonfunctional requirements are important, the design of functional requirements is where the true value is to the designer or end user. Thus, the user would prefer to focus on functional requirements (equipment control, product flow control, and so forth) providing direct improvements in value rather than dealing with superfluous technology issues.

In another case, system design does not sufficiently enable trade-offs between overhead burden (memory footprint, CPU cycles, and so forth) and application coupling. For instance, processing load should be better distributed across the system in accordance with system capabilities. Thus, if one part of the system is shut down, alternative processing capability should be in place to allow production to continue. For example, a user initially designs and installs a control system suiting their immediate needs. Incremental changes are then applied to controllers and often new interface functions are added to the human machine interface (HMI) for such controllers. Current solutions however do not facilitate a smooth and uncomplicated transition for the respective changes. Multiple technologies underneath many vendors' products complicate configuration and management of systems. This is also aggravated when third party systems are involved. Such complexity hinders the system's capacity to provide higher-level information and reduces its ability to easily configure such systems.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A logical module and framework is provided that facilitates access to a broad range of control system functionality while hiding complex details of interfacing to such functionality. In one aspect, a module provides an association of logic with one or more resources. The logic controls the state of the resources whereas the resources define components or states of a system that perform an action such as a machine, controller, or software component. Modules hide the user from internal interfaces, messages, and logic specific to the resources yet provide standard or generic interfaces to external systems. This allows control engineers to work with the published functionality of the module independent of how the functionality was achieved which minimizes system integration and maintenance requirements.

Modules may include other modules including nested modules where standard module behaviors and attribute patterns can be represented using common data model representations for module classes, module templates and module inheritance. Module classes and templates can be maintained in libraries which facilitate access to desired system functionality and further promote system integration. Resources can have various states associated therewith such as common S88 state classifications including idle, hold, abort, and so forth where a module presents logic to represent state machines that manage the state of the resource.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent

DETAILED DESCRIPTION

Systems and methods are provided to facilitate interaction with an industrial control system while mitigating interface requirements and integration nuances of diverse components of the system. In one aspect, a logical module for an industrial automation system is provided. This includes one or more resources to perform an action and a logic component to control the state of the resources. A module employs the resources and the logic component to expose functionality of the module while providing generic interfaces to external components of the module. In this manner, the generic or standard interfaces allow control engineers and users to easily interact with the functionality of the module while being shielded from the complexities and inter-workings therein.

It is noted that as used in this application, terms such as "component," "resource," "module," "model, " and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
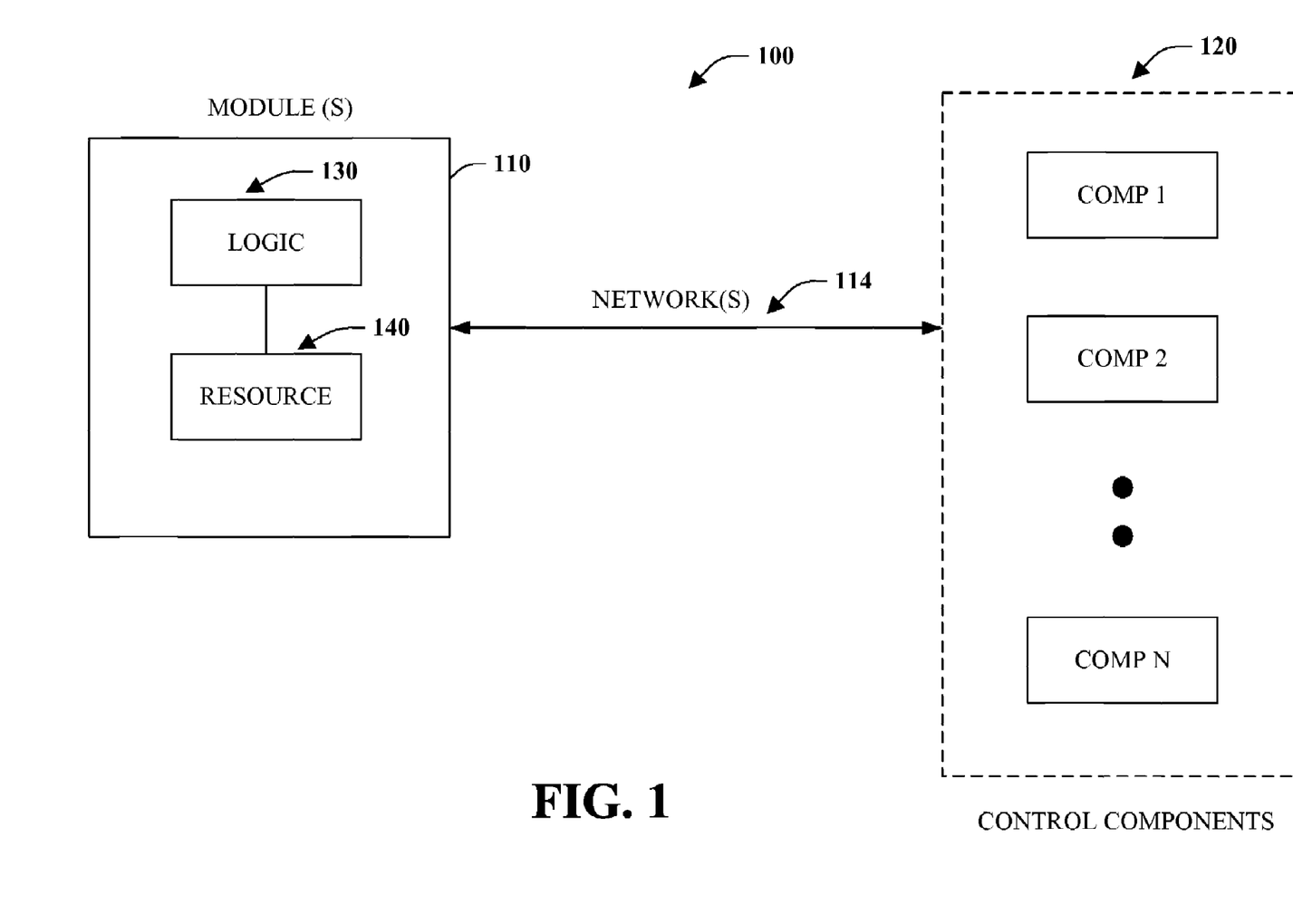
FIG. 1 is a schematic block diagram illustrating logical modules for an industrial automation system.

Referring initially to FIG. 1, a system 100 illustrates a module component 110 (hereinafter referred to as a module) for an industrial automation system. The module 110 is employed to define, interface, and execute functionality of one or more industrial control system components 120 which are described in more detail below. As illustrated, the modules 110 can be accessed across a network 114 from the control components 120. The network 114 also allows online access to the modules 110 and their respective control components 120 and also enables creating the modules 110 in an offline manner such as in a computer database (not shown). When created offline, the modules 110 can subsequently be downloaded for execution on the control components 120. Modules 110 can be interfaced by users via standard interface methods such as via a graphical user interface (GUI) and/or can be configured to interact with a plurality of other modules 110 or control components 120.

In general, the module 110 is an association of logic 130 with one or more resources 140. The logic 130 includes program code that can alter the state of a resource 140 for example, ladder code, function chart, script, JAVA, C code, and so forth. The resources 140 are those components or elements that perform an activity in a system including equipment and personnel that perform work in a system. Other examples of types of resources 140 include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). In general, the modules 110 hide the user from internal interfaces, messages, and logic specific to the resources yet provide standard or generic interfaces to external systems or between components 120. This allows control engineers to work with the published functionality of the module 110 independent of how the functionality was achieved which mitigates system integration and maintenance requirements, thus reducing costs.

Modules 110 may include other modules including nested modules (described in more detail below) where standard module behaviors and attribute patterns can be represented using common data model representations for module classes, module templates and module inheritance. Module classes and templates can be maintained in libraries which facilitate access to desired system functionality and further promote system integration. Resources 140 can have various states associated therewith such as common S88 state classifications including idle, hold, abort, run, reset, stop, restart, and so forth where the module 110 can present logic 130 to represent state machines that manage the state of the resource 140. During application, resource modules (described below) take on the name of the resource 140 that is the primary focus on the module 110. For example, an Equipment module is primarily focused on coordination of equipment but may involve personnel in the process. Similarly, a Personnel module is focused on coordination of personnel but may involve other resources in the process. A Control Module that manages a material may be referred to as a Material Control Module.

An Instance of a modular automation component can be considered a real item in the automation system 100, typically viewed in an Organizational View, Geographical View, or Asset Management View. An example of an Instance is a specific named Valve in a plant (e.g., XV101), where XV101 is linked to the Valve control module template. A Bound Instance is an instance that has been assigned to one or more computing resources (e.g., controller, HMI Server) so that it can execute. A Deployed Instance is one that has been bound to its computing resources and "loaded" to make it available to execute. When deployed, the module is activated to begin executing. An Activated Instance is one that has been deployed and is actively executing on its computing resources be it standalone computers or control system resources such as programmable logic controllers.

Before proceeding, it is noted that the components 120 can include various computer or network components such as servers, clients, programmable logic controllers (PLCs), communications modules, mobile computers, wireless components, control components and so forth which are capable of interacting across the network 114. Similarly, the term PLC as used herein can include functionality that can be shared across multiple components, systems, and or networks 114. For example, one or more PLCs can communicate and cooperate with various network devices across the network 114. This can include substantially any type of control, communications module, computer, I/O device, sensor, Human Machine Interface (HMI)) that communicate via the network 114 which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network 114 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 2:
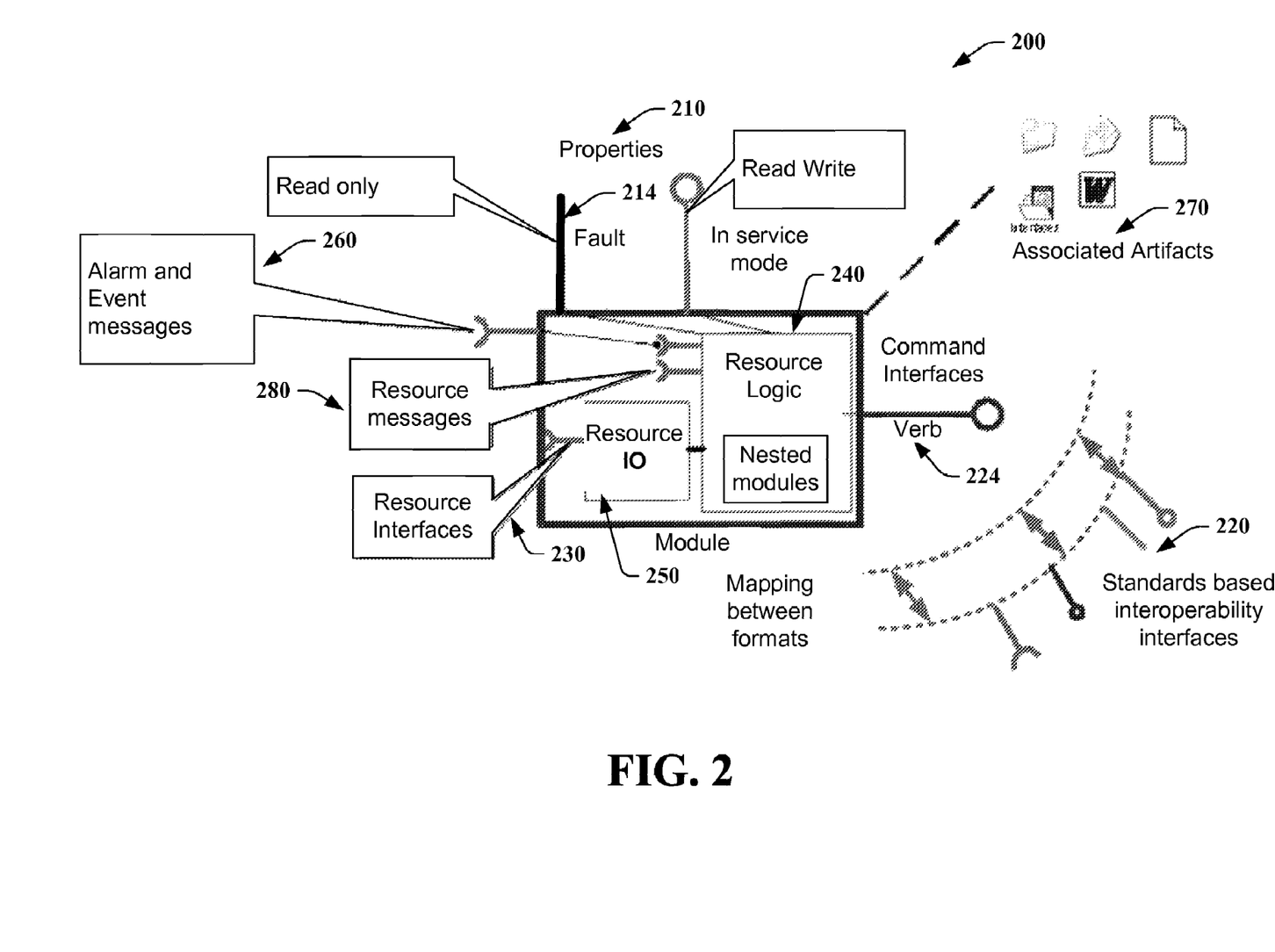
FIG. 2 is a diagram illustrating module attributes.

Referring now to FIG. 2, module attributes 200 are illustrated. The attributes 200 depicted in FIG. 2 include a common (or exemplary) representation that can be modules from modules. Generally, a set of standard attributes can be determined that are common to all modules. Similarly, for other types of modules described below, additional standard attributes can be defined. An example of a property 210 available on modules includes attributes such as Fault and Status at 214. Active resource modules (e.g., equipment and personnel) can support additional properties 210 such as available/unavailable.

Attributes presented below are represented associations from the module to objects which may be internal in a common data model (See. FIGS. 8-11) or elsewhere (e.g., CAD Files). At 220, standard public interfaces can be provided. These interfaces 220 publish verbs 224 that are available to external systems and are documented activities that hide the complexity of the underlying code used to implement the interface. Interfaces 220 can be considered into at least two common usage scenarios. For example, interfaces 220 can be used as access points that can be used to hook in real time diagnostics, security and so forth.

Public verbs 224 initiate an action within the module. The activity is described to clients of the interface 220. The implementation is considered private and is not presented to clients—for example, Open, Stop, Abort, Shut, and so forth. A data value property 210 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 210 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 220. e.g., Conversion Map, Name, Description, expiry date, personnel contact information. Some properties 210 can be common to all instances of resource modules (e.g., scanned copy of resource specification documents), whereas other properties 210 are specific to each module instance (e.g., Status, percent open).

At 230, internal resource interfaces include interfaces from logic 240 in the module to the resource being managed at 250, where the logic includes code and/or configuration that processes a command and/or updates state and data properties. In some cases, this can be hardware such as I/O interfaces, or in other cases it is to subordinate resource control modules that have direct interfaces. Some examples include I/O mapping, material management logic routines, and so forth. These interfaces 230 are internal to the module enabling the modules public interfaces 220 and properties 210 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 220 to runtime systems may then consider these interfaces as internal.

At 260, alarm and event messages can be provided which include messages that exposed as runtime messages visible to external systems during the execution of the module. This includes alarms and events explicitly coded by the developer and system messages promoted to be visible by external systems. At 270, one or more artifacts include information that document the operation and structure of the resource such as for example, wiring diagrams, warranties, payroll, parts supplier information, and so forth. Visualization aspects include associated graphics that present the resource state and properties to applications interacting with the resource. For example: faceplates, icons, state overlays, edit dialogs, help files. At 280, system messages allow modules to listen for and publish data model messages to external components. Inbound messages are typically used to manage modules (configure, initialize, propagate properties, and so forth) and publish messages on module activity (resource state, data model messages, and so forth).

Figure 3:
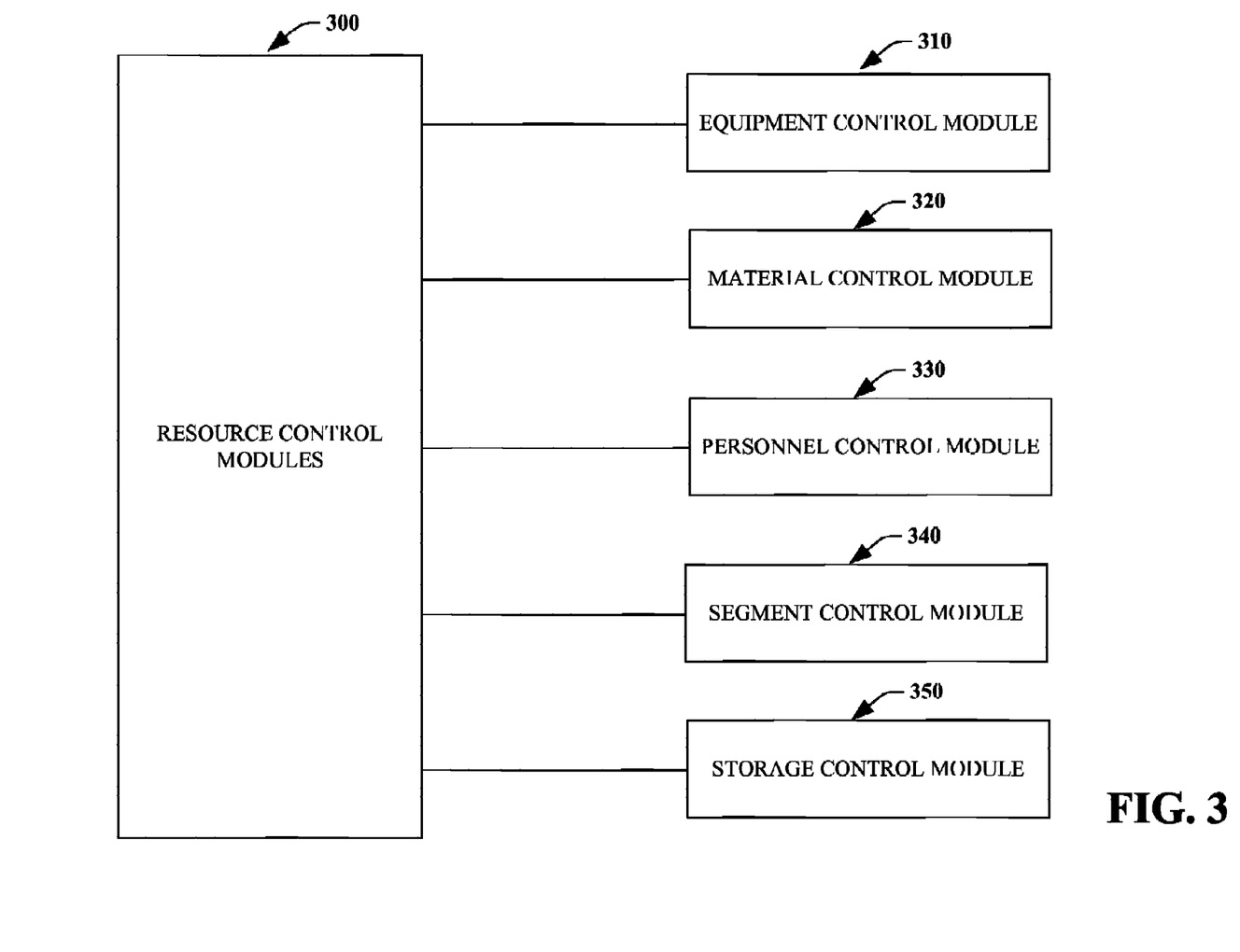
FIG. 3 is a diagram illustrating example resource control modules.

Turning to FIG. 3, example resource control modules 300 are illustrated. In general, resource control modules 300 provide simple control of one or more resources. The resource control module (RCM) 300 represents the logic to manage the state or data of the resource and may contain other resource control modules to achieve its respective functionality. The RCM 300 provides public interfaces via actions and properties. In some cases, an action may be a simple bit value or a request value that is interfaced to internal values in the module and in other cases more complex logic can be provided. The RCM 300 can include other resource control modules and may promote a command to be represented as segment resource control interface. Example forms of the RCM 300 include:

At 310, an Equipment Control Module (Common name="Control Module") CM. The simplest form of basic regulatory control of equipment. Encapsulating the equipment and its control such as control of values, drives, and so forth. At 320, a Material Control Module (MCM) can be provided. Management of Material resource instances which are represented as sub-lots including change in location, quality status, availability, order status, logic that can be performed on material sub-lots, generation of material events such as consumed, produced and moved events, sub-lot combination, expiry dates, and so forth.

At 330, a Personnel Control Module (PCM) is provided. This includes management of individual people such as Active, Idle, Break states directly or via shift schedules. This also includes data associated with people such as shift time patterns, for example. Other attributes that may be managed by PCM 330 are a person's location in a plant (GPS), qualification checks, or current assignment, for example. At 340, a Segment Control Module (SCM) includes manipulation of simple segment tasks such as piping paths, AGV paths, device state machines, robotic sequences and so forth. The SCM 340 typically performs an action on one segment such as next step to execute after the current step. At 350, a Storage Control Module (STGCM) includes Manipulation of simple storage logic such as buffer capacity and ordering into and out of a queue for the respective storage unit or requirement.

Figure 4:
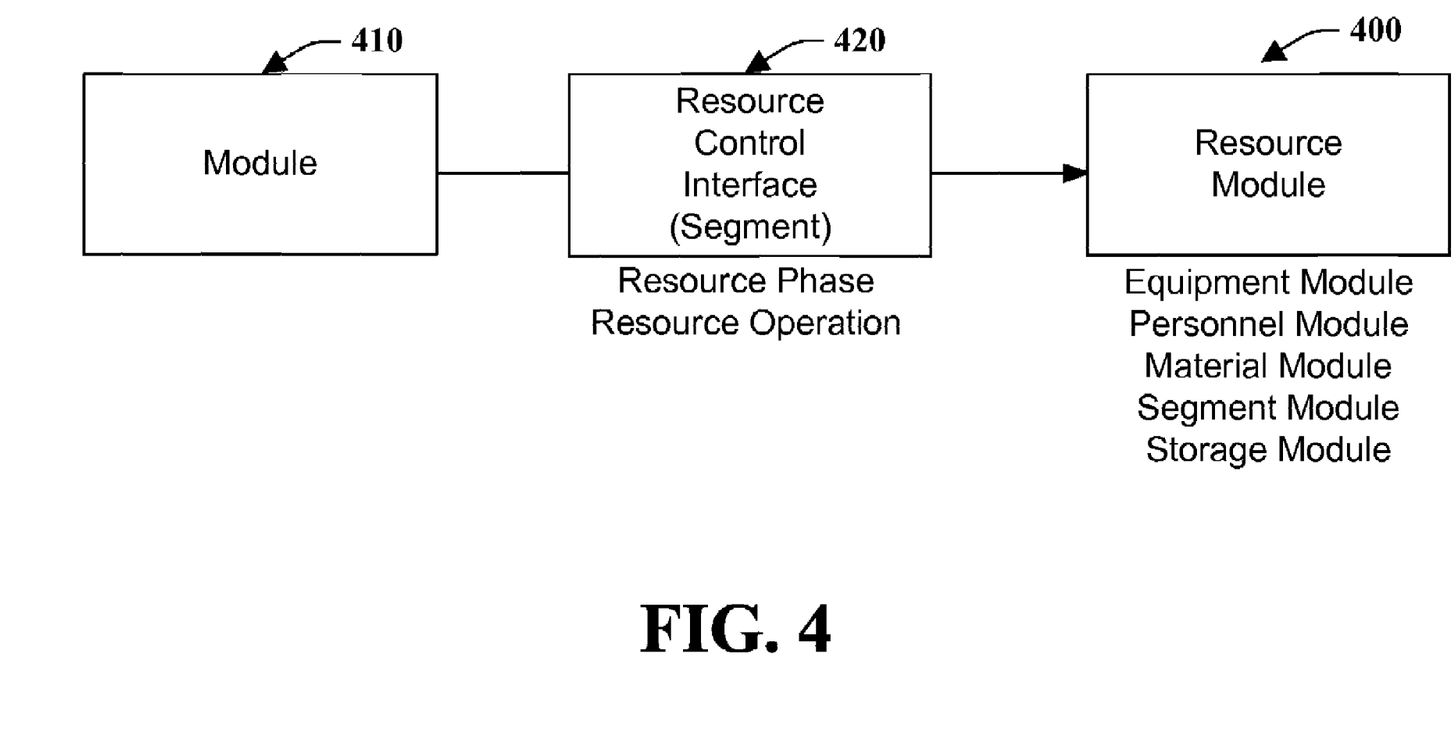
FIG. 4 is a diagram illustrating a resource module.

FIG. 4 illustrates a resource module 400 for an industrial control system. Resource modules 400 extend resource control modules described above to enable coordination of resources (equipment, people, modules and so forth) to achieve. As shown, the resource control module 400 includes a module 410 and a resource control interface 420. Resource modules 400 are also able to represent more complex activities than resource control modules. For example, resource modules may include other resource control modules at 410 and/or other resource modules. For example, an equipment module may leverage a subordinate material control module to represent material handling aspects or a segment module to solicit an electronic signature.

Before proceeding it is noted that other types of modules are possible than shown. For instance, a configuration module may include management definitions and configuration of resources—personnel, segments, equipment, segments, storage, and so forth. Another type of module includes nested modules where a module references other modules. These modules may be children of a parent module or shared from one module to another. Resource modules may include resource control modules however resource control modules should not include resource modules. Modules can include modules focused on other resource types, for example an equipment module may include equipment modules and material modules.

Figure 5:
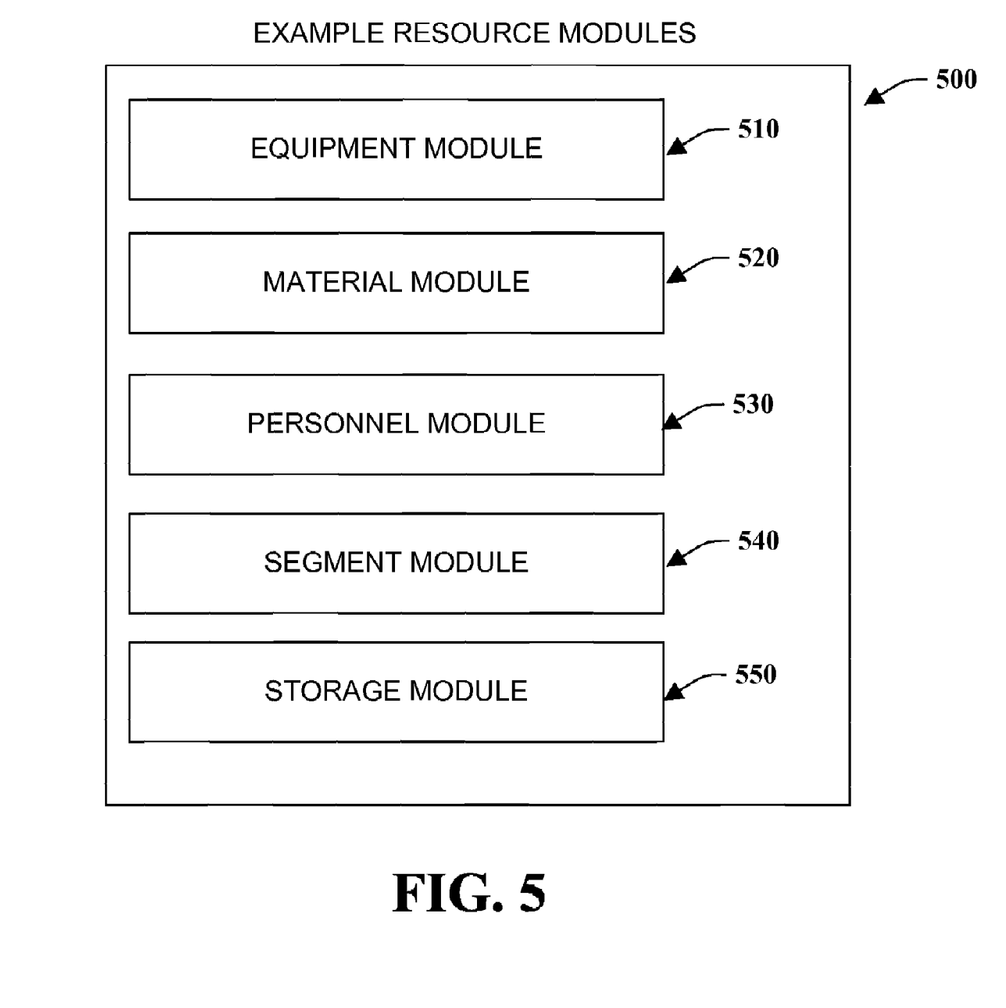
FIG. 5 is a diagram illustrating example resource modules.

FIG. 5 illustrates example resource modules 500 for an industrial control system. At 510, an Equipment Module provides coordination of equipment modules and equipment control modules to perform a process orientated task independent of specific material e.g., In-feed, AGV controller, Conveyor, and so forth. At 520, a Material Module provides coordination of material modules and material control modules to perform material focused tasks e.g., Material reservation, provision, material mass balance calculation, Bill of Material management, Work order management, and so forth. At 530, a Personnel Module provides coordination of personnel modules and personnel control modules to perform personnel focused tasks e.g., Electronic signature collection, Security validation, certification validation, Manual control interactions, and so forth.

At 540, a Segment Module provides coordination of segment modules and segment control modules and to execute sequences of tasks represented by segments. Segments define resource requirements and ordering that can represent most production and process activities. This module provides access to more complex tasks that require specific sequences to be followed e.g., Process Analytics Technology (PAT) integration, electronic signatures collection, defect, process deviation and fault recovery processing. The segment module 540 may also construct a sequence to be followed which can be applied as manual, automatic or semi automatic sequences (e.g., Route, recipe execution) At 550, a Storage Module provides coordination of storage related activities, allocation of storage to requestors, modeling of inventory calculations and so forth. This also includes interaction with higher-level systems that manage storage and inventory information.

Figure 6:
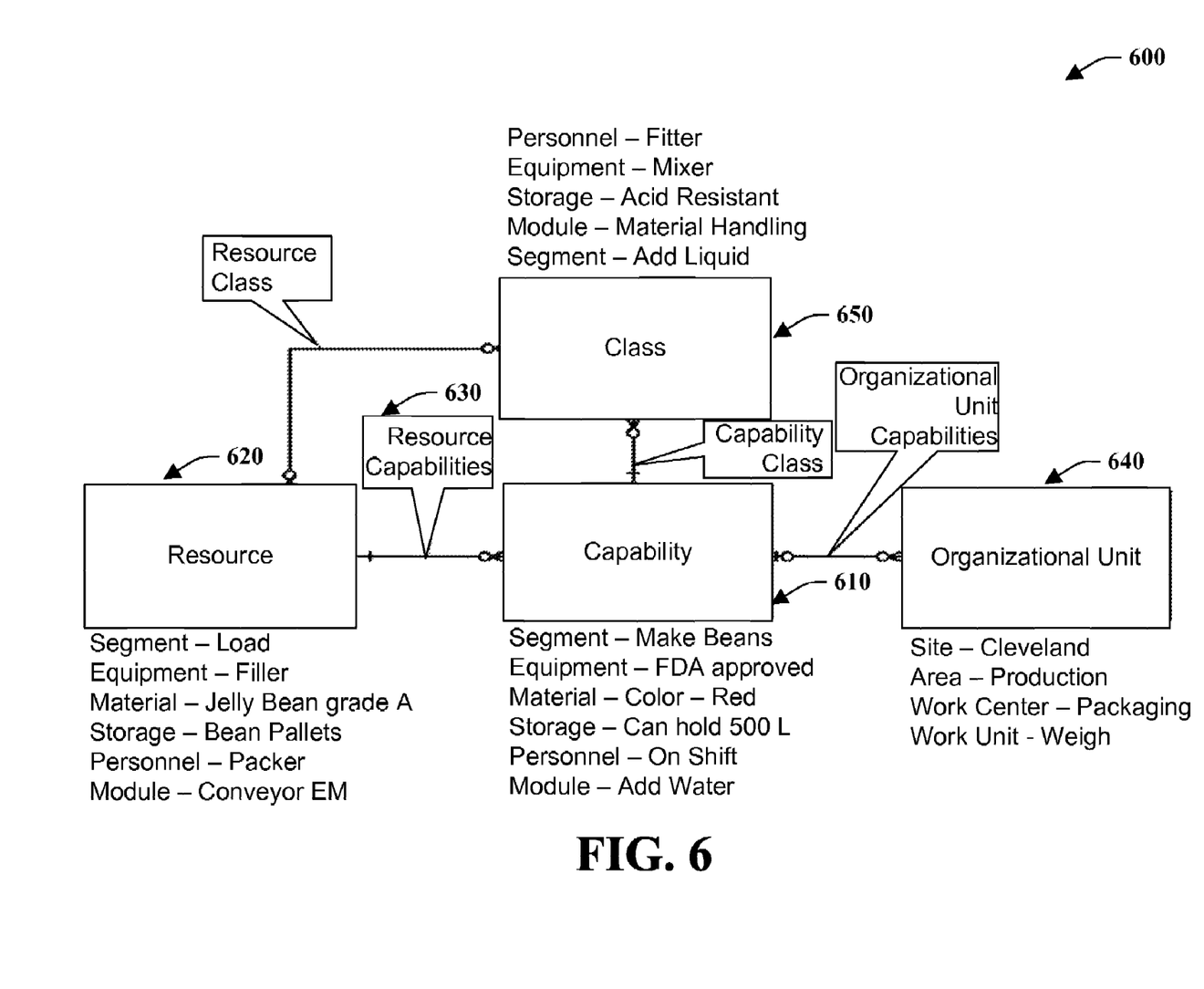
FIG. 6 is a diagram illustrating a resource control model.

FIG. 6 illustrates an example resource control model 600 for an industrial control system. Resource Control Interfaces are the interfaces exposed to production management systems for resource binding and arbitration purposes. The interfaces are elements of the resource control model 600 including procedures, operations or phases. These interfaces are made available by exposure via one or more capabilities 610 described below. Procedures, operations and phases depicted in this model 600 are commonly referred to in association with their module resource type such as Equipment Phase, Personnel Phase, Segment Phase, or as a generic Resource Phase where no specific resource module is required. Production management including Product Production Rules (production route or control recipe) physically bind to (reference) resource control phases to perform work. The availability of other resources 620 such as material, equipment, personnel are considered during the binding process of product production rules to work centers (production lines, process cells, and so forth). These selection processes evaluate resource capabilities to locate the appropriate resource for the task.

Resource capabilities 610 include the resource 620 required to perform work in a production system. Consequently, resources 620 are at the centre of, efficiency, capacity, scheduling and arbitration considerations. A resource's ability to work or be available to allow work to commence is represented as resource capability at 630. The existence of capability 630 associated with a resource 620 does not make the resource available for production; the resource's capability 630 is associated with organizational units 640 that are will support the respective resource capability. For example, an operator (personnel resource) may have qualifications for a Mixer in line 1, where this qualification capability is only in effect with that specific mixer unless explicitly directed. Resource arbitration algorithms can search for resource capabilities 630 in the scope of organizational units 640 they are to be executed within.

Resources 620 publish capabilities to organizational units 640 for use by system processes in a given scope. Modules are a type of resource and can be accessed directly by published capabilities 610. However, a more common interface to Resource Modules is via verbs that are supported by the Resource Module noted above. These verbs are Resource Control elements (phases, operations, procedures . . . ) which are segments. A published capability of a resource module is typically one of the phases supported the module. Resource control interfaces are published (made available) to the outside world as capabilities 610. Resource modules provide the ability to promote a command to become a resource control interface.

Some process control systems are built using only Resource control modules (especially control modules). Examples of this are continuous processes such as petrochemical and heavy chemical plants. In order to initiate, the process takes a plant up to its running state or makes a change to the state of a series of commands that are initiated and coordinated to achieve the new state. It is also possible to promote commands from resource control modules to appear as capabilities which can be accessed as "tuning knobs" for tweaking the system between system states. As shown in the model 600, the resource 620 and capability can be associated with a higher level class or abstraction 650.

Figure 7:
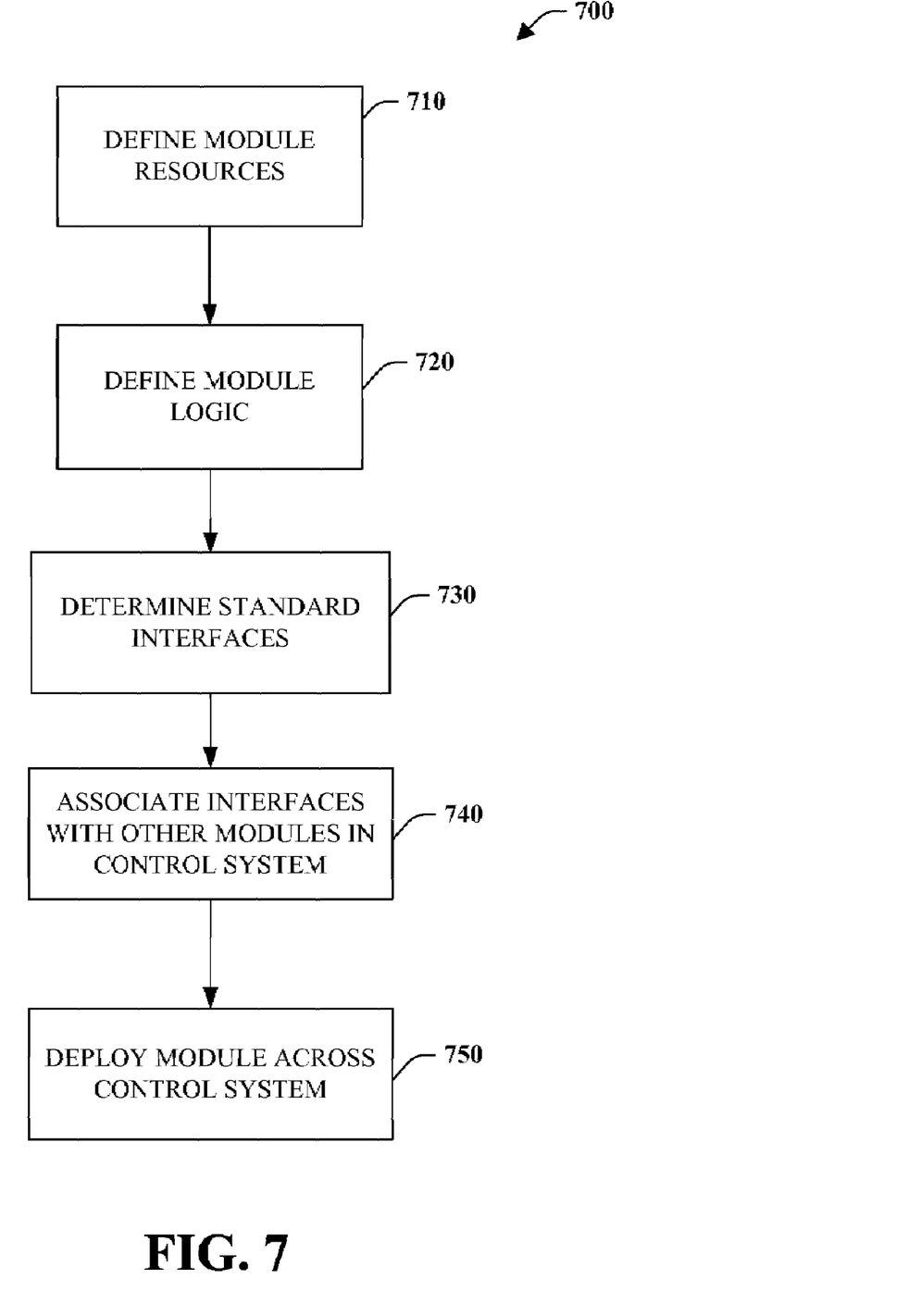
FIG. 7 is a flow diagram illustrating a module control process.

FIG. 7 illustrates a module control process 700 for an industrial automation system. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 710 of FIG. 7, one or more resources are defined for a module. As noted previously, these can include equipment, personnel, segments, storage, computers, control assets and so forth that are defined to perform actions or work in a system. At 720, module logic is defined. This includes the code (or hardware) that controls the actions defined in 710. Such code can be of a higher level including structured programming languages and is generally contained within the module and hidden from view. As noted above, it is desired to expose functionality of a module in a generic manner while mitigating details of the inner workings of the module including the respective logic. At 730, one or more standard or generic interfaces are defined for the module. This includes defining high level abstractions for the interfaces rather than specific interfaces directed to a particular product. For example, general interfaces may be specified as INF_Command which defines a general command to direct a module execute its internal logic related to some aspect of a control situation. This mitigates having to learn a vendor-specific command (e.g., INF_VENDA_Protocol_Command) for a module that could be in many different forms or languages. At 740, interfaces specified for various modules are associated with one or more other modules to form a control application. In other words, the various modules defined and their respective interfaces specify the operations/actions to be performed of the control solution.

At 750, modules are deployed across an organization to implement the desired control solution. In this aspect, modules leverage a common data template and versioning capabilities. A module template represents common module attributes as defined above. Module templates along with other templates of equipment, workflow and so forth can be packaged into libraries. The module template may reference unbound parameters including operating parameters, initialization requirements, resource templates (equipment templates) and classes (equipment classes . . . ) and interfaces to external and internal systems. A Module instance can be instantiated from the module template.

During deployment the module instance binds unbound required parameters until all entries are resolved. This may take multiple iterations to complete. The configuration of the target of the deployment (controller, application server) and the resources in the scope of the target deployment can be factors in the resolving of parameters during the bind process. Module deployment leverages common data model deployment work flow capabilities. During the deployment activity, a reference link from the module instance to the module template and from deployed instance of the module and the original source template is established. The deployment cycle may be performed in a number of iterations successively filling in parameters. Similarly a deployed module may be used to construct a template.

FIGS. 8-11 illustrate aspects of a common data model noted above. Now turning to FIG. 8, hierarchical representations that can be employed in connection with a schema employed by programmable logic controllers to facilitate use of a hierarchically structured data model are illustrated. The hierarchies illustrated in this figure relate to equipment hierarchies, which can be integrated with procedure hierarchies to generate a robust representation of a plant (which is incorporated within a schema for use in connection with industrial controllers). A first hierarchy 800 illustrates a representation of equipment within a plant given disparate processes. For instance, a hierarchy in accordance with a batch process can include a representation of an enterprise, site, area, process cell, unit, equipment module, and control module. In contrast, a hierarchical representation of equipment within a continuous process can include representations of an enterprise, site, area, production unit, continuous unit, equipment module, and control module. In still more detail, an enterprise can represent an entirety of a company, a site can represent a particular plant, an area can represent a portion of the plant, a process cell can include equipment utilized to complete a process, a unit can relate to a unit of machinery within the process cell, an equipment module can include a logical representation of portions of the process cell, and the control module can include basic elements, such as motors, valves, and the like. Furthermore, equipment modules can include equipment modules and control modules can include control modules. Thus, as can be discerned from the figure, four disparate hierarchical representations can be employed to represent equipment within batch processes, continuous processes, discrete processes, and inventory.

Figure 8:
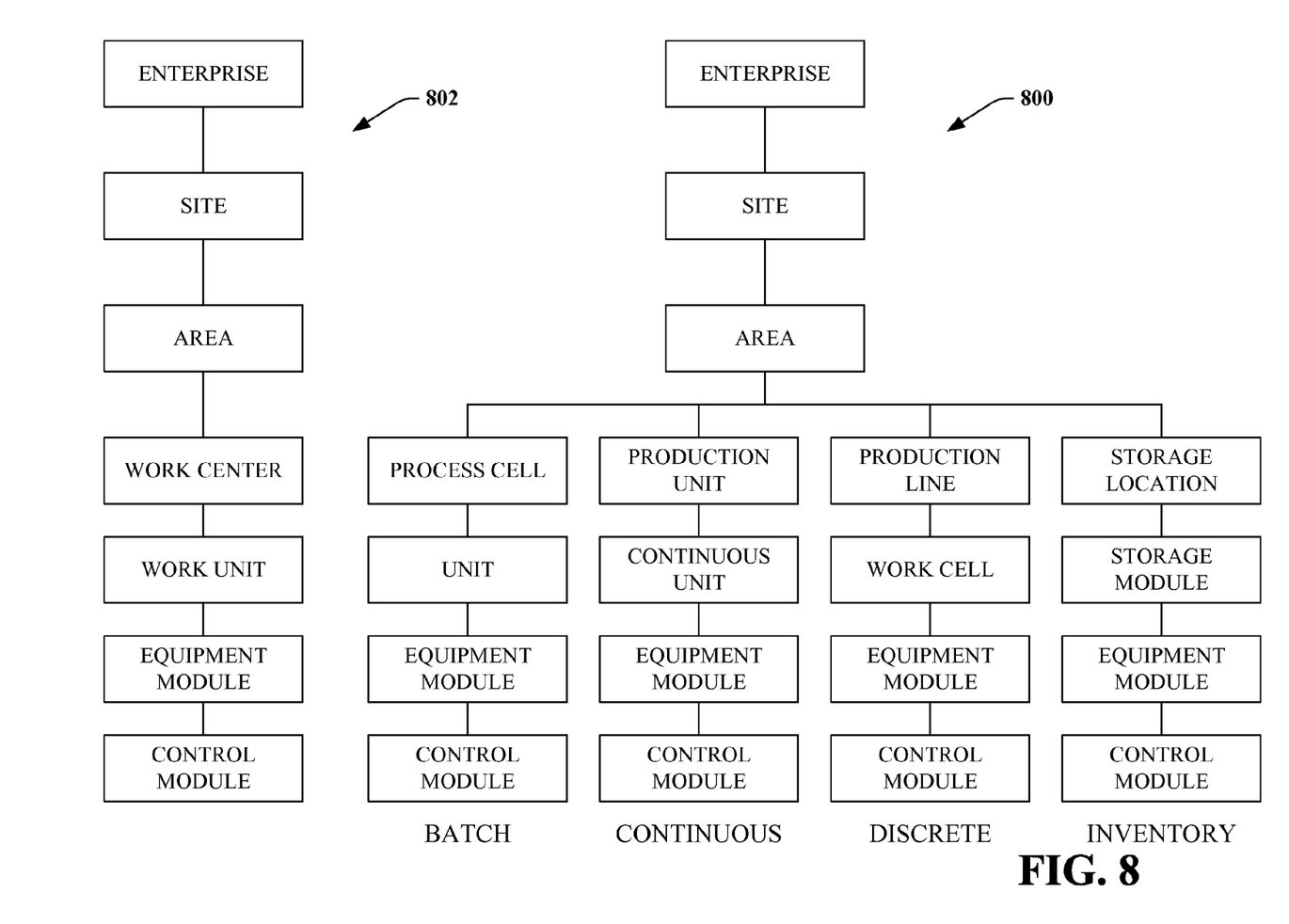
FIGS. 8-11 illustrate a common data model that can be employed with modules in an industrial automation system.

A second hierarchy 802 can be utilized that represents each of the aforementioned hierarchical representations. The hierarchy 802 can include representations of an enterprise, a site, an area, a work center, a work unit, an equipment module, and a control module. Thus, a common representation can be generated that adequately represents the hierarchy 800. For purposes of consistent terminology, data objects can be associated with metadata indicating which type of process they are associated with. Therefore, data objects can be provided to an operator in a form that is consistent with normal usage within such process. For example, batch operators can utilize different terminology than a continuous process operator (as shown by the hierarchy 800). Metadata can be employed to enable display of such data in accordance with known, conventional usage of such data. Thus, implementation of a schema in accordance with the hierarchy 802 will be seamless to operators. Furthermore, in another example, only a portion of such representation can be utilized in a schema that is utilized by a controller. For instance, it may be desirable to house equipment modules and control modules within a controller. In another example, it may be desirable to include data objects representative of work centers and work units within a controller (but not equipment modules or control modules). The claimed subject matter is intended to encompass all such deviations of utilizing the hierarchy 802 (or similar hierarchy) within a controller.

Figure 9:
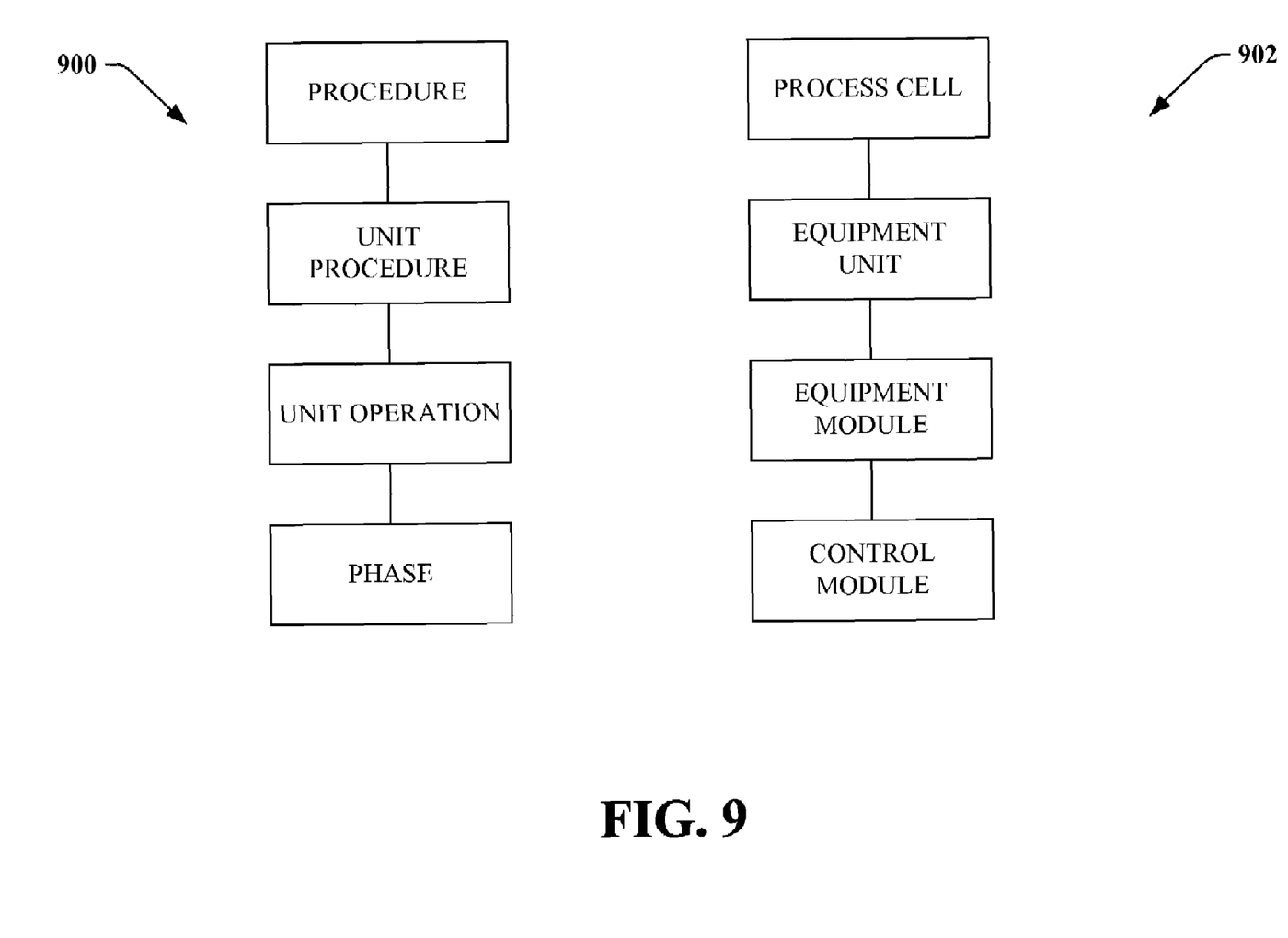

Referring to FIG. 9, standard hierarchies that can be utilized to represent procedures and equipment are illustrated. In particular, a hierarchy 900 represents procedures that can exist within a batch process. For instance, a procedure can relate to a high-level procedure, such as creation of a pharmaceutical drug. A unit procedure can be more specific, such as adding particular chemicals to a mix by way of a particular unit. A unit operation can be still more specific, and a phase can be yet more specific (relating to operation of low-level machines). For instance, a phase can relate to various states which can exist with respect to low-level equipment, such as stopping, starting, pausing a motor, opening and closing a valve, and the like. A hierarchy 902 relating to a representation of equipment in, for example, a batch process is displayed adjacent to the hierarchy 900.

Figure 10:
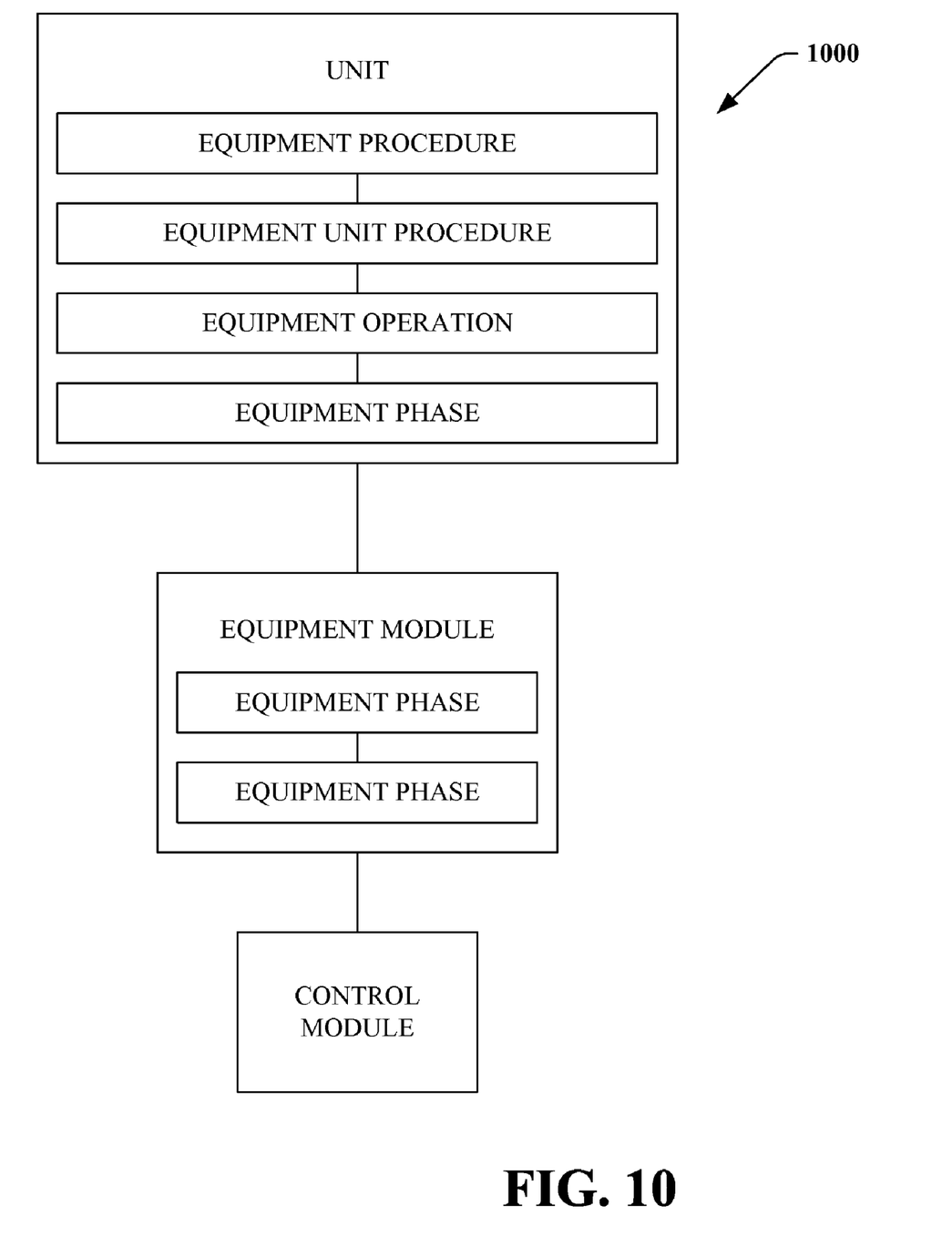

Turning to FIG. 10, a hierarchy 1000 that represents one possible integration of the example hierarchies 900 and 902

Figure 11:
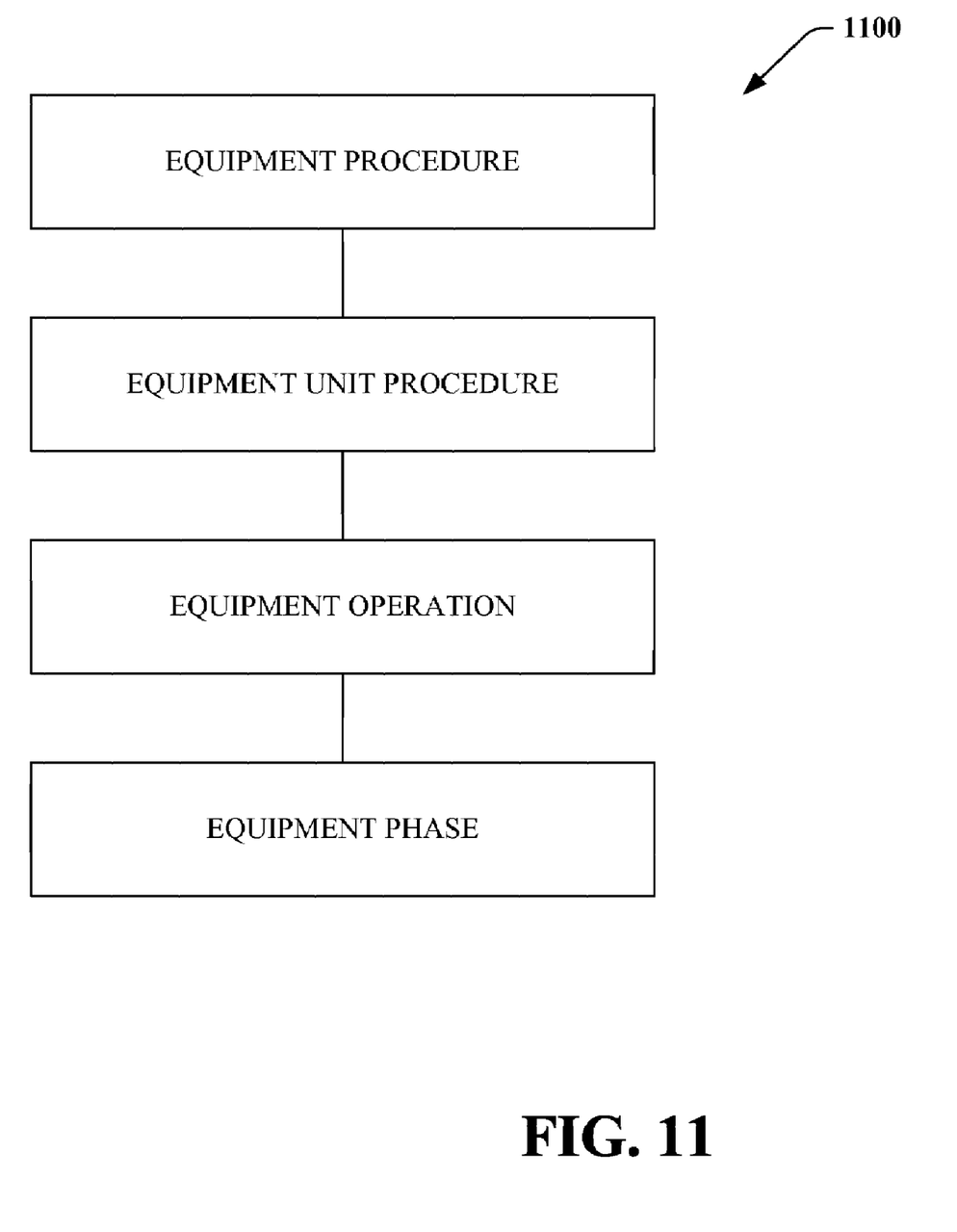

(FIG. 9). A unit (such as a work unit described in FIG. 8) can be associated with an equipment procedure, an equipment unit procedure, an equipment operation, and an equipment phase). Thus, the procedures, operation, and phase can be associated with a particular work unit. An equipment module can be associated with one or more equipment phases, and can be above a control module in the hierarchy. Referring Briefly to FIG. 11, a hierarchy 1100 that can be utilized in connection with equipment control is illustrated. The hierarchy is substantially similar to that described within the unit portion of the equipment unit. As stated above, the hierarchies illustrated in FIGS. 8-11 can be based upon a standard, such as ISA 88, ISA 95, or other standard. Any suitable representation that can be utilized to model an entirety of a plant, however, is contemplated. Further, the representations shown in these figures can be directly implemented into a controller. For instance, data objects in accordance with any portion of the hierarchies described in FIGS. 8-11 can be existent within a controller, together with state machines that enable creation of such objects.

It is noted that the above modules can be processed on various types of computing devices and resources, where some of these devices may be associated with an industrial control component and other devices associated with standalone or networked computing devices. Thus, computers can be provided to execute the above modules or associated data that include a processing unit, a system memory, and a system bus, for example. The system bus couples system components including, but not limited to, the system memory to the processing unit that can be any of various available processors. Dual microprocessors and other multiprocessor architectures also can be employed as the processing unit.

The system bus can be any of several types of bus structure (s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory includes volatile memory and non-volatile memory. The basic input/output system (BIOS), containing the basic routines to transfer information between elements within the computer, such as during start-up, is stored in nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Computing devices also includes removable/non-removable, volatile/non-volatile computer storage media.

It is to be appreciated that software components can be provided that act as an intermediary between users and the basic computer resources described in suitable operating environment. Such software includes an operating system which can be stored on disk storage, acts to control and allocate resources of the computer system. System applications take advantage of the management of resources by operating system through program modules and program data stored either in system memory or on disk storage. It is to be appreciated that the present invention can be implemented with various operating systems or combinations of operating systems or shared with control systems.

Computers can operate in a networked environment using logical connections to one or more remote computers, such as remote computer(s). The remote computer(s) can be a personal computer, a server, a router, a network PC, a workstation, a microprocessor based appliance, a peer device or other common network node and the like, and typically includes many or all of the elements described relative to computer. Remote computers can be logically connected through a network interface and then physically connected via communication connection. Network interfaces encompass communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL), and wireless networks.

The systems described above employing the authentication protocols can include one or more client(s). The client(s) can be hardware and/or software (e.g., threads, processes, computing/control devices). The systems can also include one or more server(s). The server(s) can also be hardware and/or software (e.g., threads, processes, computing/control devices). The servers can house threads to perform transformations by employing the authentication protocol, for example. One possible communication between a client and a server may be in the form of a data packet adapted to be transmitted between two or more computer processes.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
   at least one equipment resource control module, comprising:
      a common interface that includes one or more attributes and input/output capabilities that are standard among a plurality of modules; and
      logic of a first platform that controls a state of at least one equipment resource in the industrial automation system;
   at least one material resource control module, comprising:
      the common interface that includes one or more attributes and input/output capabilities that are standard among the plurality of modules; and
      logic of a second platform that controls at least one component in the industrial automation system that manages at least one material resource; and at least one resource module that coordinates the at least one equipment resource control module and the at least one material resource control module, wherein the at least one material resource control module is subordinate to the at least one equipment resource control module.

2. The system of claim 1, at least one of: the at least one equipment resource control module, the at least one material control module or the at least one resource module is accessed across a network.

3. The system of claim 2, the network allows online and offline access to at least one of: the at least one equipment resource control module, the at least one material resource control module or the at least one resource module.

4. The system of claim 1, the at least one equipment resource is an active resource and the at least one material resource is a passive resource.

5. The system of claim 1, the at least one equipment resource control module creates an instance of the at least one equipment resource.

6. The system of claim 5, the instance is an executable bound instance assigned to one or more computing resources.

7. The system of claim 5, the instance is a deployed instance bound to one or more computing resources and available for execution.

8. The system of claim 5, the instance is an activated instance bound to one or more computing resources and actively executing on the one or more computing resources.

9. The system of claim 1, the at least one resource module comprises a command interface that publishes one or more verbs that are available to external systems.

10. The system of claim 9, the command interface is an access point for real time diagnostics and security.

11. The system of claim 1, the one or more attributes include one or more alarm and event messages that are visible to external systems during execution of at least one of the at least one equipment resource control module or the at least one material resource control module.

12. The system of claim 1, the one or more attributes include one or more artifacts that include information that documents an operation or a structure of at least one of the at least one equipment resource control module or the at least one material resource control module.

13. The system of claim 1, the one or more attributes include one or more system messages that allow at least one of the at least one equipment resource control module or the material resource control module to listen for and publish data model messages to external components.

14. The system of claim 1, the state is classified by a common S88 state classification, including at least one of idle, hold, abort, run, reset, stop or restart.

15. A method for generating industrial control components, comprising:
defining a first module, comprising:
choosing one or more resources that perform one or more actions in an industrial automation system from a plurality of resources, wherein the plurality of resources includes at least two of an equipment resource, a material resource, a segment resource or a storage resource;
defining logic to control the one or more actions performed by the one or more resources; and
defining at least one standard interface for the module independent of a platform of the logic; and
associating the at least one standard interface with at least a second module;
deploying the first module, comprising binding the first module to at least one run time process that utilizes a hierarchical common data model.

16. The method of claim 15, deploying the first module comprises:
instantiating a module instance from a module template, wherein the module template comprises unbound required parameters; and
binding the unbound required parameters.

17. The method of claim 16, further comprising:
establishing a reference link from the module instance to the module template;
creating a bound instance of the first module;
establishing a reference link from the bound instance to an original source template; and
constructing a new template from the bound instance of the first module.

18. An industrial automation system, comprising:
an equipment module, comprising logic of a first platform associated with one or more equipment resources that controls one or more actions performed by the one or more equipment resources and a standard interface for the equipment module independent of the first platform;
a material module that is subordinate to the equipment module, comprising logic of a second platform associated with one or more material handling resources, wherein the material module is associated with the equipment module via the standard interface;
wherein the equipment module manages at least one process in the industrial automation system by managing a state of the one or more equipment resources and leveraging the material module to represent material handling characteristics of the process,
wherein the equipment module is bound to the at least one process that utilizes a hierarchical common data model.

19. The system of claim 18, further comprising a segment module, subordinate to the equipment module, comprising logic associated with one or more segment resources.

20. The system of claim 19, the equipment module further manages the at least one process in the industrial automation system by leveraging the segment module to solicit an electronic signature.

* * * * *